Aug. 28, 1956  R. R. KEITH  2,760,783
WHEEL SUSPENSION SYSTEM
Filed Sept. 4, 1953  4 Sheets-Sheet 2
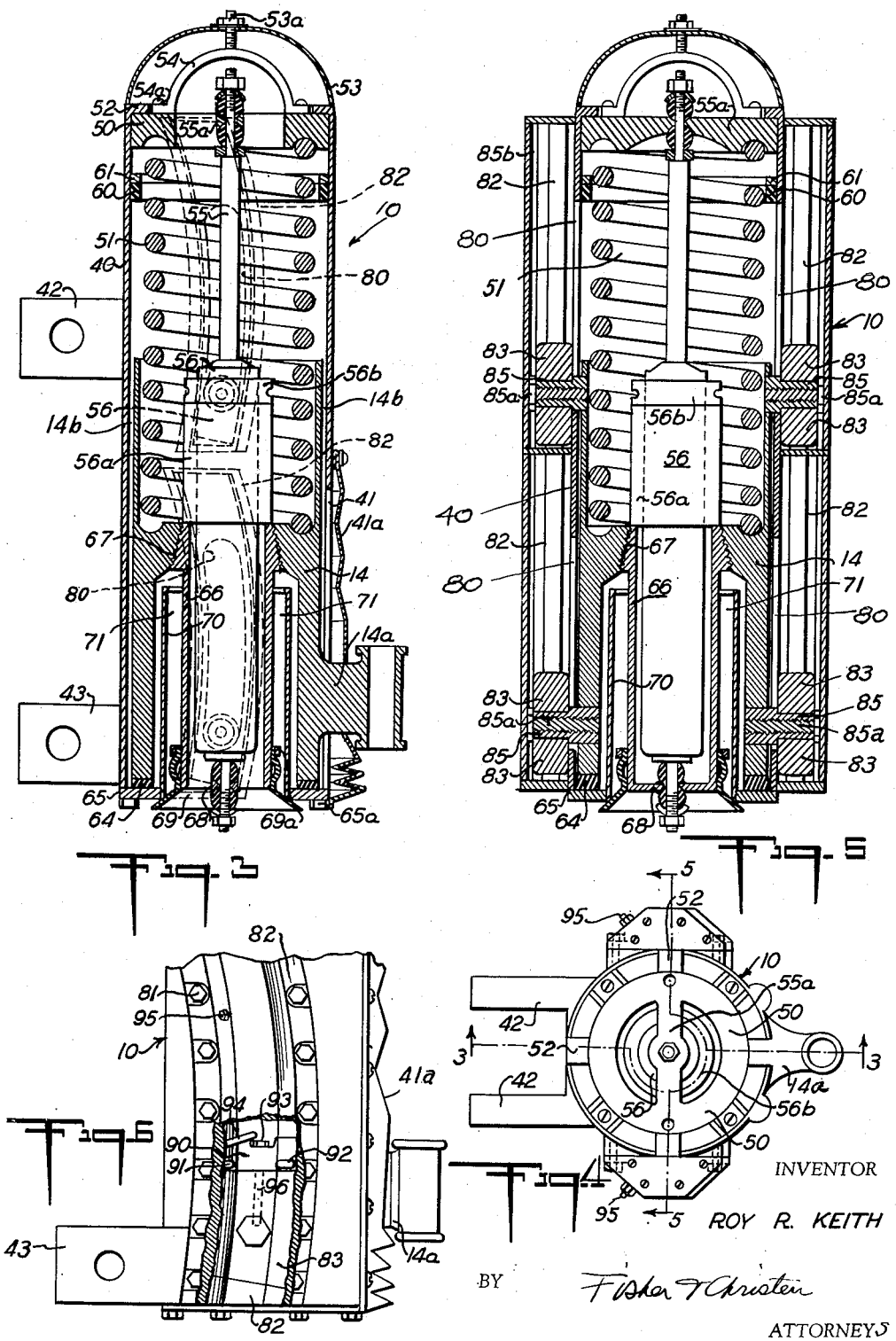
INVENTOR
ROY R. KEITH
BY Fisher & Christen
ATTORNEYS

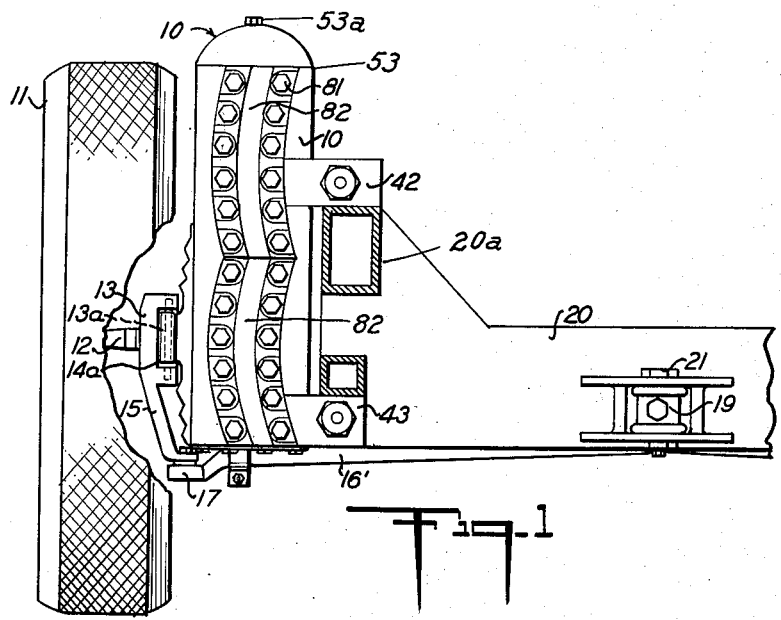
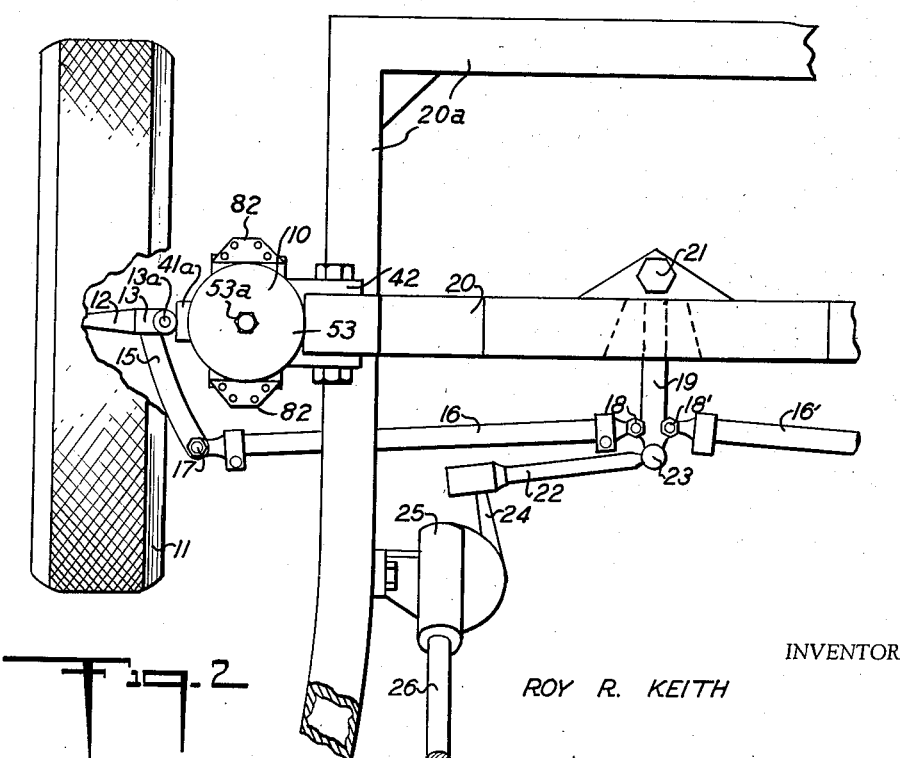

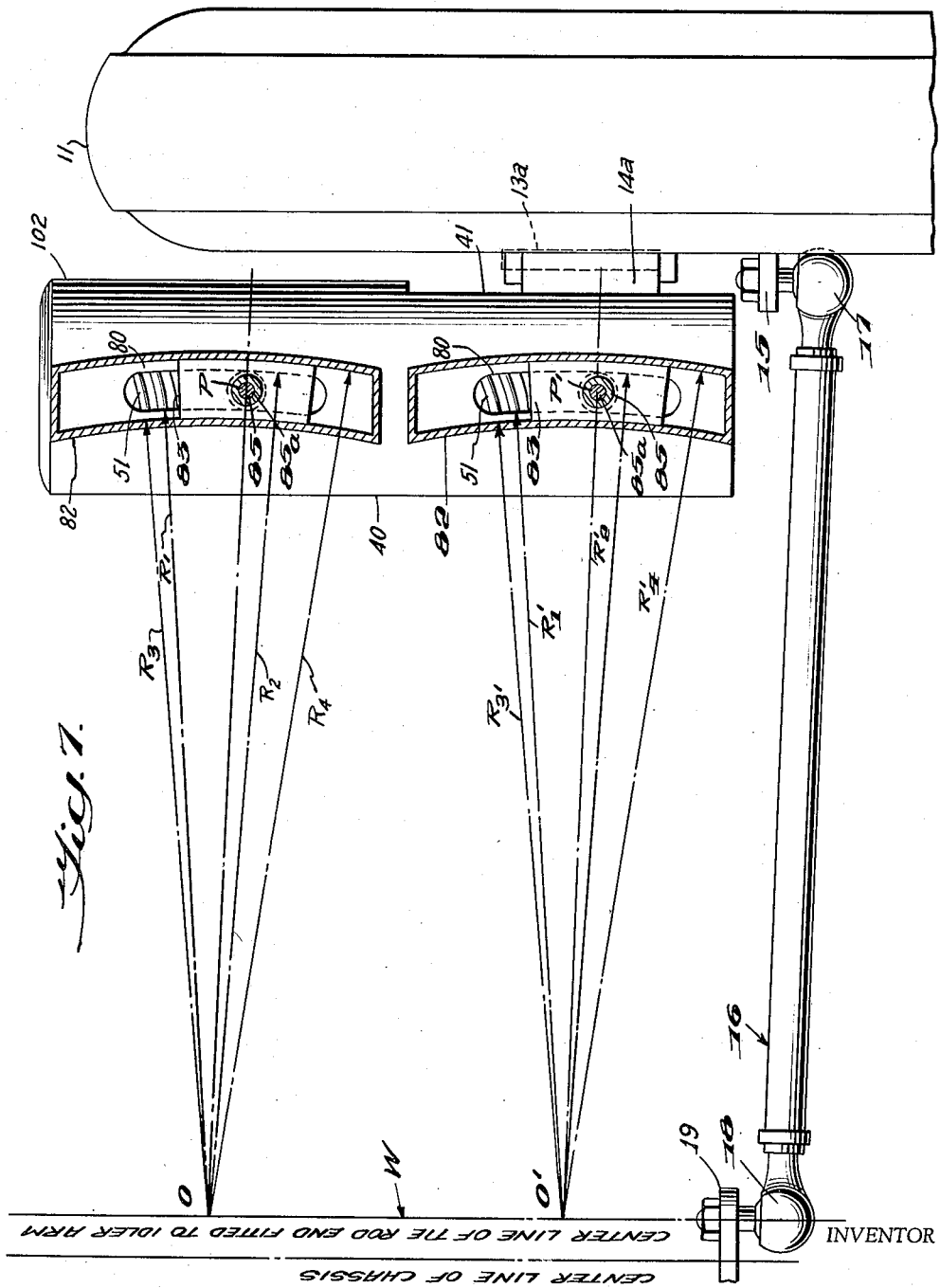

Aug. 28, 1956  R. R. KEITH  2,760,783
WHEEL SUSPENSION SYSTEM
Filed Sept. 4, 1953  4 Sheets-Sheet 4
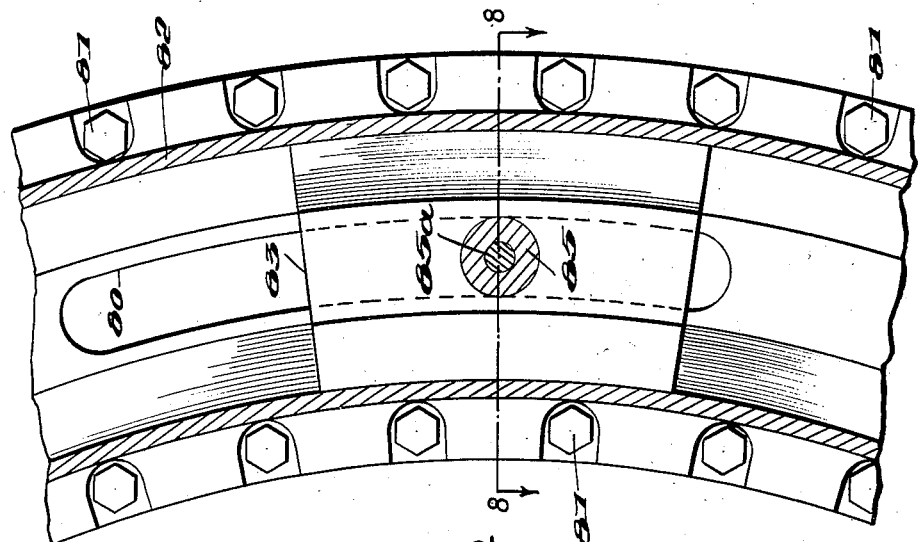
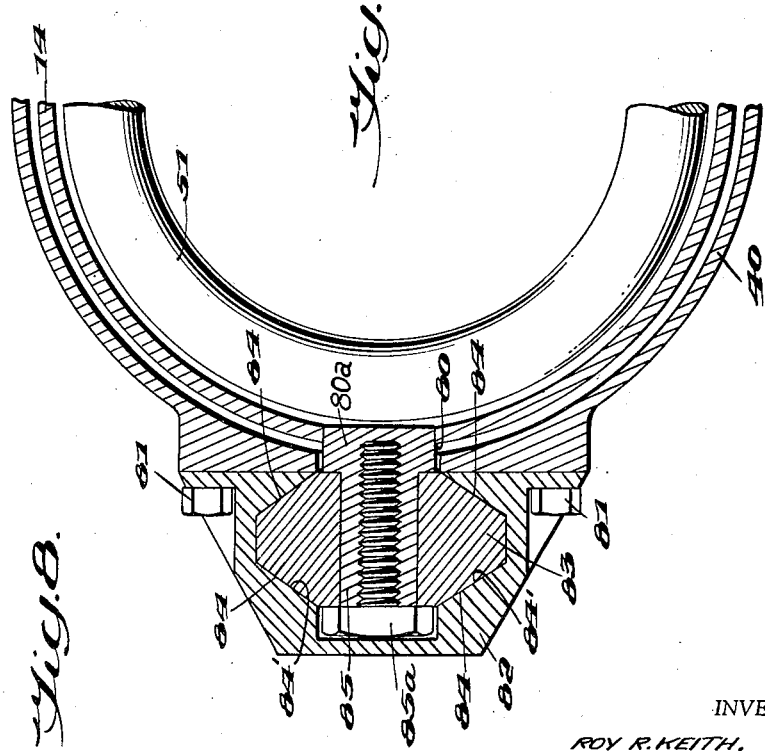
INVENTOR
ROY R. KEITH,
BY Fisher & Christen,
ATTORNEYS United States Patent Office 2,760,783
Patented Aug. 28, 1956

2,760,783

WHEEL SUSPENSION SYSTEM

Roy R. Keith, Arlington, Va.

Application September 4, 1953, Serial No. 378,453

12 Claims. (Cl. 280—95)

This invention is a suspension system for the independent springing of the wheels of motor vehicles, more especially the steerable front wheels, and comprises a vertically positioned housing or casing alongside the wheel: this casing contains one or more shock absorbing springs, which are connected to slide blocks which in turn are connected to the wheel mounting; these slide blocks move in curved or arcuate guideways in the housing; as the wheel compresses the spring in the housing, the slide blocks move in their curved guideways.

An important feature of these curved guideways is that their respective centers of curvature are near the center line of the car chassis, actually in a fore and aft vertical plane through the inner end of the steering tie rod. In the prior art, mounting rods for independent suspension of the front wheels have been pivoted near the center line of the chassis, with their outer ends pivoted to the wheel mounting. With the present invention, no such mounting rods extending inwardly for some distance toward the center line of the vehicle, are used. However, a similar effect is achieved by the use of slide blocks moving in arcuate guideways, the centers of curvature of which are near the center line of the chassis. By the elimination of the mounting rods of the prior art, some of which may be longer than others, a geometrically more accurate mounting is provided, which is compact and provides a strong and sturdy arrangement.

More specifically, the housing or casing, which is carried by the chassis, is provided with a vertically movable support for the usual king pin; this vertically movable support moves upwardly against a spring and so acts as a shock absorber. This support is connected with the slide blocks mentioned above. There are preferably four such slide blocks, two on each side, and each slide block moves in an arcuate guideway, the centers of curvature of the four curved guideways being well inwardly of the car, in a vertical plane near the center line of the car.

Considering the two slide blocks on one side of the housing, one of which is above the other, and moving in arcuate guideways respectively centered at O for the upper slide block and at O' for the slide block just below it, and considering the center or pivot of the upper slide as P and the lower slide as P', then the line OPP'O' forms a parallelogram, located in a substantially vertical plane. The axis of the steering tie rod, as will be described, is substantially parallel to lines OP and O'P', which are also parallel to each other.

Referring now to the drawings, illustrating one way of carrying out the invention:

Fig. 1 is a front elevation of a wheel suspension in accordance with this invention;

Fig. 2 is a plan view thereof.

Fig. 3 is a vertical cross section, on an enlarged scale, through the housing, looking toward the rear of the vehicle with respect to Fig. 2.

Fig. 4 is a top plan view of Fig. 3.

Fig. 5 is a vertical cross section, taken at right angles to Fig. 3.

Fig. 6 is a fragmentary view, partly in section, of the lower part of Fig. 5.

Fig. 7 is a diagrammatic vertical front view, partly in section, looking from the front of the left front wheel, to illustrate the curvatures of the arcuate guideways and associated parts;

Fig. 8 is a fragmentary horizontal section, on an enlarged scale, showing the specific construction of one of the arcuate guideways and slide block movable therein; and Fig. 9 is a side view, partly of Fig. 8, looking toward the right of Fig. 8.

Referring now to the drawings, Fig. 1 shows the front end of a motor vehicle with my wheel suspension unit, broadly designated at 10 mounted thereon. Each road wheel, 11, is rotatably mounted in the conventional manner on a wheel spindle 12 which is preferably formed integrally with a steering knuckle 13, the latter being supported for swinging steering movement on a supporting unit 14 by means of the usual king pin 13a which extends through the knuckle 13 and supporting unit extension 14a.

A steering arm 15 is fixed to each steering knuckle 13 and extends rearwardly to be articulated with their respective laterally extending tie rods 16 and 16' by means of the usual coupling 17 which permits universal motion between these parts. The inner ends of the steering tie rod are articulated closely adjacent each other near the end of the idler arm 19 at 18 and 18' to also permit universal movement. The idler arm 19 is connected to the frame cross arm, broadly designated at 20, as at 21. Arm 20 is carried by the chassis 20a. The steering gear connecting rod 22 has its inwardly extending end articulated with the idler arm 19 as at 23. The outer end of rod 22 is articulated to the pitman arm 24 of the usual steering gear operating mechanism 25 which is adapted to be actuated by the usual steering column 26; which projects rearwardly and upwardly into the driver's compartment (not shown).

The suspension housing unit 10 and cooperating parts constitute the important feature of this invention, and comprises a cylindrical housing 40. On the road wheel side, the housing 40 has a slot 41, Fig. 3, to permit the supporting unit extension 14a to oscillate therein. This slot 41 is provided with a cover in the form of a flexible, corrugated rubber boot 41a through which the supporting unit extension 14a protrudes. The suspension housing is provided with a pair of upper and lower brackets, 42 and 43, for bolting it to the chassis. In the preferred embodiment of the invention, brackets 42 and 43 are positioned so that the wheel supporting unit 10 extends vertically as high as it is practical in order that the center of gravity may be kept low. The suspension housing must be a unit of substantial strength, since all suspension parts are attached to it rigidly or connected to the axle-supporting unit 14 which moves up and down in its housing.

A spring seat 50, so fashioned as to permit the installation or removal of the suspension spring 51 from the top of the suspension housing, serves as an abutment for the spring at the top of the housing 40. The suspension spring is preferably preloaded, so that it is under predetermined load before being applied to the vehicle. That is, the spring would be compressed considerably when it is installed in the housing. By such preloading, the spring would be able to support the weight of the vehicle after such weight is applied without being compressed a great deal as a consequence of having the vehicle's weight imposed upon it.

In assembling the unit, the seat 50 is placed against the spring and pressure is applied to compress the spring until it reaches the spring seat brackets 52. The seat is then twisted or turned slightly to clear the brackets 52 and then more pressure is applied to compress the spring 51 until the spring seat is beneath the supporting brackets 52. The spring 51 is then aligned beneath the brackets and pressure is taken off the spring to permit the seat to come to rest against the brackets 52. These brackets 52 for supporting the spring seat are preferably welded to the suspension housing wall 40. It will be noted that the brackets 52 thus define a plurality of slots through which the seat 50 may be inserted. This upper spring seat 50 also serves as the seat 55a for a piston rod 55 of a conventional shock absorber 56. A dome bracket 54 is attached to the upper side of this unit by screws 54a, and a cover 53 is then attached as by the nut and bolt 53a.

A means for limiting the upward movement of the wheel supporting unit 14 is provided in the form of a ring of rubber 60 which is vulcanized to a steel backing plate 61, which is in turn fixed to the wall of the suspension housing 40 as by welding. It will be noted that under normal conditions the wheel supporting unit will not rise to a sufficient degree to engage the rubber bumper or cushion 60 but that the bumper is intended to provide yielding abutment for the wheel-supporting unit such as when heavy shock is imparted to the road wheel or in the event that the spring should break. Means are also provided for limiting the downward travel of the wheel-supporting unit 14 (similar to that described) for limiting and cushioning the upward movement of this unit, in the form of a rubber bumper 64, carried by the base plate 65.

This lower bumper 64 is designed to function as a means for limiting the downward movement of the axle supporting unit 14. A tubular bracket 66 is threaded near its upper end for attachment to the threaded bore 67 in the axle-supporting unit 14. A drilled cross bar 68 at the lower end provides a means for mounting the shock absorber stud to the bracket 66. A rubber shield 69 is fitted over the outside of the shock absorber bracket and secured thereto by means of a steel strap 69a. This rubber shield 69 is provided to prevent dirt and the like from passing up into the housing 40. A dust shield 56a, of relatively thin metal is provided and may be integral with the bracket 66 just below it, which is of thicker metal.

A circular base plate 65 is bolted at 65a to the base of housing 40 and has a tube 70 welded to it, acting to exclude dust. The top of tube 70 is open and spaced from 66, to provide clearance for oscillation of member 14.

*The mounting of slide blocks in arcuate guideways*

The vertically movable member 14, Figs. 3 and 4, in which the king pin of the wheel is mounted, and which moves upwardly against spring 51 is connected to and guided by slide blocks; there are two slide blocks on each side, one above the other, four in all. These slide blocks are mounted to move in four arcuate guideways, the centers of curvature of which are at or near the center line of the vehicle.

This mounting of the slide blocks in arcuate guideways is the most important feature of the invention and will now be described in detail.

The curvature of the guideways is such as to approximate the curvature of the arc described by the outer end of the usual steering rod with which the wheel mounting is associated.

Each side of the casing 40 is provided with two arcuate slots 80, one above the other, as in Fig. 7. The movable member 14 is provided with guides 80a, Fig. 8, one for each slot 80 and curved to move in such slots. Bolted to the casing 40 by cap bolts 81 is an interiorly channeled guideway 82, having outwardly converging surfaces 84, in which move slide blocks 83. Slide blocks 83 have oppositely beveled outwardly converging surfaces 84' so as to take a thrust in either direction. Each slide block 83 is pivoted so as to rotate on a bushing 85 carried by movable member 14 and is held in place thereon by a thrust screw 85a. Bushing 85 and guide 80a are secured together and 80a is welded to or into member 14.

Referring now particularly to the diagrammatic showing in Fig. 7, illustrating the geometry of the parts, the upper curved arcuate slot 80 and its corresponding arcuate guideway 82 are arcuately curved from a center point O; the lower slot 80 and its corresponding arcuate guideway are arcuately curved from a center point O'. Points O and O' are in a vertical longitudinal plane through the center line of the tie rod 16. Considering the axis of upper and lower screws 85a as points P and P' respectively, lines OPP'O' form a parallelogram, in which $OP=O'P'$ and $OO'=PP'$. The arm 16 is also substantially parallel to OP and O'P'.

The arcs described by the slide blocks 83 as they move in their arcuate guideways have approximately the same curvature as the arc described by the outer end of the steering rod 16. The clearance 71 between 66 and the wall of 70 and the clearance 14b between the outer wall of 14 and 40, are provided to accommodate the slight lateral movement of 14 as the blocks 83 move up and down in the curved guideways 82.

With the wheel mounting of the present invention, the camber and caster of the wheels are not changed, because the wheel moves up and down in substantially the same plane. Also, the normal toe-in of the wheels is not affected.

The lines $R_1$ and $R_2$, designating the inner and outer edges of slot 80, and $R_3$ and $R_4$, designating the inner and outer edges of the guideway 82, represent the radius of curvature of these parts about O as a center. Correspondingly primed references at the lower part of the figure, represent the radius of curvature of these parts about O' as a center.

In operation, when the wheels hit an obstruction or irregularity in the road, the stresses are transmitted through brackets 14a to 14 to compress springs 51. As this happens, the slide blocks 83 move in their respective curved guideways and so give the proper spring to the wheels, by virtue of their arcuate movements about points located a substantial distance inwardly of the chassis.

In order to lubricate the parts, there may be provided a wick lubricator 90, Fig. 6, having wicks 91 and 92, to carry lubricant to guideway 82, 90 being held in place by bolt 93. A rubber grommet 94 guides lubricant from fitting 95 to lubricator 90. Another wick 96 may be provided to lubricate bushing 85.

While the invention has been described in some detail, it should be understood that the invention is not to be limited to the exact details shown, but may be carried out in other ways.

I claim:

1. In combination, a motor vehicle, a chassis therefor, a steerable front wheel for the motor vehicle, a king pin for said wheel, a vertically disposed housing fixed to the chassis of the motor vehicle, a wheel supporting unit slidably mounted for vertical movement in said housing, said wheel supporting unit including means for engaging with and pivotally mounting the king pin of the wheel for permitting the wheel to pivot about the king pin, spring means in said housing for resisting upward movement of said wheel supporting unit, a steering tie rod pivoted at its outer end to said wheel and pivoted at its inner end near the center line of said chassis, said housing being provided with arcuate guideways in opposite sides thereof, said arcuate guideways having an arcuate curvature the arc of which has its center in substantially the same vertical plane longitudinally of the vehicle as the pivoted inner end of said tie rod, and slide blocks carried by said wheel supporting unit and movable in said arcuate guideways.

2. In combination, a motor vehicle, a chassis therefor, a steerable front wheel for the motor vehicle, a king pin for said wheel, a vertically disposed housing fixed to the chassis of the motor vehicle, a wheel supporting unit slidably mounted for vertical movement in said housing, said wheel supporting unit including means for engaging with and pivotally mounting the king pin of the wheel for permitting the wheel to pivot about the king pin, spring means in said housing for resisting upward movement of said wheel supporting unit, said housing being provided on each side with two arcuate superposed guideways, and slide blocks carried by said wheel supporting unit and movable in said arcuate guideways.

3. The combination as set forth in claim 2, wherein lines connecting the centers of curvature of two of said superposed arcuate guideways on the same side of the housing with each other and with the centers of the slide blocks also on the same side of the housing, and a line connecting the centers of said two slide blocks, form a parallelogram.

4. The combination as set forth in claim 1, wherein the radii of the arcs defining said arcuate guideways are approximately equal in length to one-half the width of the chassis.

5. The combination of claim 1, wherein said arcuate guideways and slide blocks are provided with cooperating outwardly converging relatively slidable surfaces for resisting endwise thrust.

6. The combination of claim 1, wherein said housing includes a shock absorber mounted therein, cooperating with said wheel supporting unit.

7. In combination, a motor vehicle, a chassis therefor, a steerable front wheel for the motor vehicle, a king pin for said wheel, a steering tie rod pivoted at its outer end to said wheel and pivoted at its inner end near the center line of said chassis, a vertically disposed housing fixed to the chassis of the motor vehicle, a wheel supporting unit slidably mounted for vertical movement in said housing, said wheel supporting unit including means for engaging with and pivotally mounting the king pin assembly of the wheel for permitting the wheel to pivot about its king pin, spring means for resisting upward movement of said wheel supporting unit, said housing being provided with arcuate guideways the curvature of which is substantially the same as the curvature of the arc described by the outer end of said steering tie rod as the wheel moves up and down, and slide blocks, carried by said wheel supporting unit and movable in said arcuate guideways.

8. In combination, a motor vehicle, a chassis therefor, a steerable front wheel for the motor vehicle, a king pin for said wheel, a steering tie rod pivoted at its outer end to said wheel and pivoted at its inner end near the center line of said chassis, a vertically disposed housing fixed to the chassis of the motor vehicle, a wheel supporting unit slidably mounted for vertical movement in said housing, said wheel supporting unit including means for engaging with and pivotally mounting the king pin assembly of the wheel for permitting the wheel to pivot about its king pin, spring means for resisting upward movement of said wheel supporting unit, said housing being provided on each side thereof with two superposed arcuate guideways, the curvature of said guideways being substantially the same as the curvature of the arc described by the outer end of said steering tie rod as the wheel moves up and down, and slide blocks carried by said wheel supporting unit and movable in said arcuate guideways.

9. The combination as set forth in claim 8, wherein lines connecting the centers of curvature of the two arcuate guideways on the same side of the housing with each other and with the centers of the slide blocks in said two guideways, and a line connecting the centers of said blocks, form a parallelogram.

10. The combination of claim 7, wherein said arcuate guideways and slide blocks are provided with cooperating outwardly converging, relatively slidable bearing surfaces for resisting endwise thrust.

11. The combination of claim 7, wherein said housing includes a shock absorber mounted therein, cooperating with said wheel supporting unit.

12. The combination as in claim 7, wherein the radii of the several arcs defining the arcuate guideways are equal in length to about one-half the width of the chassis.

References Cited in the file of this patent

UNITED STATES PATENTS

| | | |
|---|---|---|
| 2,310,821 | Wimbish | Feb. 9, 1943 |
| 2,576,824 | Bush | Nov. 27, 1951 |
| 2,670,966 | Haller | Mar. 2, 1954 |